United States Patent
Sabin et al.

(10) Patent No.: US 12,335,690 B2
(45) Date of Patent: Jun. 17, 2025

(54) NEAR-FIELD MAGNETIC INDUCTANCE COMMUNICATION WITH IN-EAR ACOUSTIC DEVICES

(71) Applicant: Bose Corporation, Framingham, MA (US)

(72) Inventors: Andrew Todd Sabin, Chicago, IL (US); Crystal P. MacKenzie, San Francisco, CA (US); Colin D. Fletcher, Needham, MA (US)

(73) Assignee: Bose Corporation, Framingham, MA (US)

( * ) Notice: Subject to any disclaimer, the term of this patent is extended or adjusted under 35 U.S.C. 154(b) by 379 days.

(21) Appl. No.: 17/697,373

(22) Filed: Mar. 17, 2022

(65) Prior Publication Data

US 2022/0303695 A1    Sep. 22, 2022

Related U.S. Application Data

(60) Provisional application No. 63/162,242, filed on Mar. 17, 2021.

(51) Int. Cl.
*H04R 25/00* (2006.01)
*G02C 11/06* (2006.01)
*H04B 5/26* (2024.01)
*H04B 5/72* (2024.01)

(52) U.S. Cl.
CPC .......... *H04R 25/554* (2013.01); *G02C 11/06* (2013.01); *H04B 5/266* (2024.01); *H04B 5/72* (2024.01); *H04R 25/50* (2013.01); *H04R 2225/025* (2013.01); *H04R 2225/43* (2013.01); *H04R 2225/55* (2013.01)

(58) Field of Classification Search
CPC .......... H04R 2225/025; H04R 2225/43; H04R 2225/55; H04R 25/50; H04R 25/554; G02C 11/06
USPC .......................................... 381/315
See application file for complete search history.

(56) References Cited

FOREIGN PATENT DOCUMENTS

WO    WO-2021086538 A1 *  5/2021  .......... H04R 1/1008

* cited by examiner

*Primary Examiner* — Phylesha Dabney (57) ABSTRACT

A system includes an in-ear acoustic device that is configured to sit at least partially within a user's ear canal and a head-worn electronic device that is supported on a user's body outside of the user's ear canal. The in-ear acoustic device includes a first receiver and a first coil. The head-worn electronic device includes a second coil that is configured to communicate with the first coil via near-field magnetic inductance (NFMI) communication. The head-worn electronic device is configured to transmit a first processed audio signal to the in-ear acoustic device via NFMI communication, and the first processed audio signal is used to drive the first receiver.

15 Claims, 7 Drawing Sheets

NEAR-FIELD MAGNETIC INDUCTANCE COMMUNICATION WITH IN-EAR ACOUSTIC DEVICES

CROSS REFERENCE TO RELATE APPLICATIONS

This application claims the priority to U.S. Patent Application Ser. No. 63/162,242, filed on Mar. 17, 2021, titled "NEAR-FIELD MAGNETIC INDUCTANCE COMMUNICATION WITH IN-EAR ACOUSTIC DEVICES" the content of which is incorporated herein in its entirety for all purposes.

BACKGROUND

This disclosure relates to near-field magnetic inductance communication with in-ear acoustic devices (e.g., hearing aids).

There are two basic types of hearing aids: behind-the-ear hearing aids; and in-the-ear (ITE) hearing aids. BTE aids sit behind or on top of the outer ear with tubing that routes the sound down into the ear canal via a custom-fit earmold or a dome style that doesn't block the entire ear canal opening.

ITE aids are worn in the ear canal and are usually custom-fit, based on an impression that is taken by your hearing care professional at the time of your hearing aid consultation. These styles are typically available in different skin tones to blend with the outer ear. Some types of ITE hearing aids fit very deeply within the ear canal, while others are closer to the outer ear. An advantage of ITE aids they are small and discrete, and, as a result, tend to be more cosmetically hidden than BTE aids. This can be desirable, particularly for hearing aid wearers that might be self-conscious about a hearing impairment and/or their reliance on the device.

SUMMARY

All examples and features mentioned below can be combined in any technically possible way.

In one aspect, a system includes an in-ear acoustic device that is configured to sit at least partially within a user's ear canal and a head-worn electronic device that is supported on a user's body outside of the user's ear canal. The in-ear acoustic device includes a first receiver and a first coil. The head-worn electronic device includes a second coil that is configured to communicate with the first coil via near-field magnetic inductance (NFMI) communication. The head-worn electronic device is configured to transmit a first processed audio signal to the in-ear acoustic device via NFMI communication, and the first processed audio signal is used to drive the first receiver.

Implementations may include one of the following features, or any combination thereof.

In some implementations, at least one of: (i) the in-ear acoustic device; and (ii) the head-worn electronic device includes a microphone, and the head-worn electronic device includes signal processing circuitry for processing a microphone signal from the microphone to produce the first processed audio signal.

In certain implementations, the processing includes: active noise cancellation; microphone beamforming; and/or speech enhancement via a deep learning algorithm.

In some cases, the in-ear acoustic device includes a first microphone, and a first signal processing circuitry electrically connected to the first microphone, the first receiver, and the first coil. The head-worn electronic device includes a second microphone, and second signal processing circuitry electrically connected to the second microphone and the second coil. The head-worn electronic device is configured to: receive one or more first microphone signals from the first microphone and/or the second microphone; process the one or more first microphone signals via the second signal processing circuitry to produce the first processed audio signal; and transmit the first processed audio signal to the hearing assistance device via the second coil.

In certain cases, the system also includes a computing device. The head-worn electronic device may include a wireless communication module for communicating with the computing device. The head-worn electronic device may be configured to receive one or more settings from the computing device and processes the one or more first microphone signals according to the settings.

In some examples, the settings include: an active noise cancellation (ANC) level; beamforming parameters; null steering parameters; and/or signal processing parameters for hearing aid processing.

In certain examples, in the absence of the head-worn electronics device, the first signal processing electronics are configured to receive and process a second microphone signal from the first microphone and produce a second processed audio signal that is used to drive the receiver.

In some implementations, the in-ear acoustic device is configured to detect the presence of the head-worn electronic device via NFMI.

In certain implementations, the head-worn electronic device is in a form selected from the group consisting of: a helmet, a hat, a visor, a headset, and eyeglasses.

In some cases, the head-worn electronic device is in the form of eyeglasses that include a frame having a frontal region, and a pair of temple pieces extending from the frontal region. The second coil may be supported in one of the temple pieces.

In certain cases, the eyeglasses also include a plurality of microphones and signal processing electronics supported on one or both of the temple pieces. The signal processing electronics may be configured to process microphone signals from the microphones to produce the processed audio signal.

Another aspect features a method that includes transmitting a first processed audio signal from a head-worn electronic device to an in-ear acoustic device via NFMI communication; and converting the first processed audio signal to acoustic energy at the in-ear acoustic device.

Implementations may include one of the above and/or below features, or any combination thereof.

In some implementations, the method includes receiving one or more microphone signals from one or more microphones of the in-ear acoustic device and/or the head-worn electronic device; and processing the one or more microphone signals using signal processing electronics of the head-worn electronics device to produce the first processed audio signal.

In certain implementations, the step of processing the one or more microphone signals includes performing one or more processing operations selected from the group consisting of: speech enhancement via a deep learning algorithm; active noise cancellation; and beamforming operations.

In some cases, the method includes receiving signal processing parameters transmitted from a computing device at the head-worn electronic device; and producing the first processed audio signal using the signal processing parameters.

In certain cases, the step of converting the first processed audio signal to acoustic energy at the in-ear acoustic device includes converting the first processed audio signal from a digital form to an analog form to produce an analog processed audio signal for driving a receiver of the in-ear audio device.

In some examples, the method includes detecting an absence of the head-worn electronic device at the in-ear acoustic device; and, in response, receiving one or more microphone signals from one or more microphones of the in-ear acoustic device. The one or more microphone signals are then processed using signal processing electronics of the in-ear acoustic device to produce second processed audio signals.

In certain examples, the in-ear acoustic device is a hearing aid (e.g., an ITE hearing aid).

In some implementations, the head-worn electronic device is in the form of eyeglasses that include a frame having a frontal region, and a pair of temple pieces extending from the frontal region. The second coil may be supported in one of the temple pieces.

It is noted that the drawings of the various implementations are not necessarily to scale. The drawings are intended to depict only typical aspects of the disclosure, and therefore should not be considered as limiting the scope of the implementations. In the drawings, like numbering represents like elements between the drawings.

DETAILED DESCRIPTION

Figure 1:
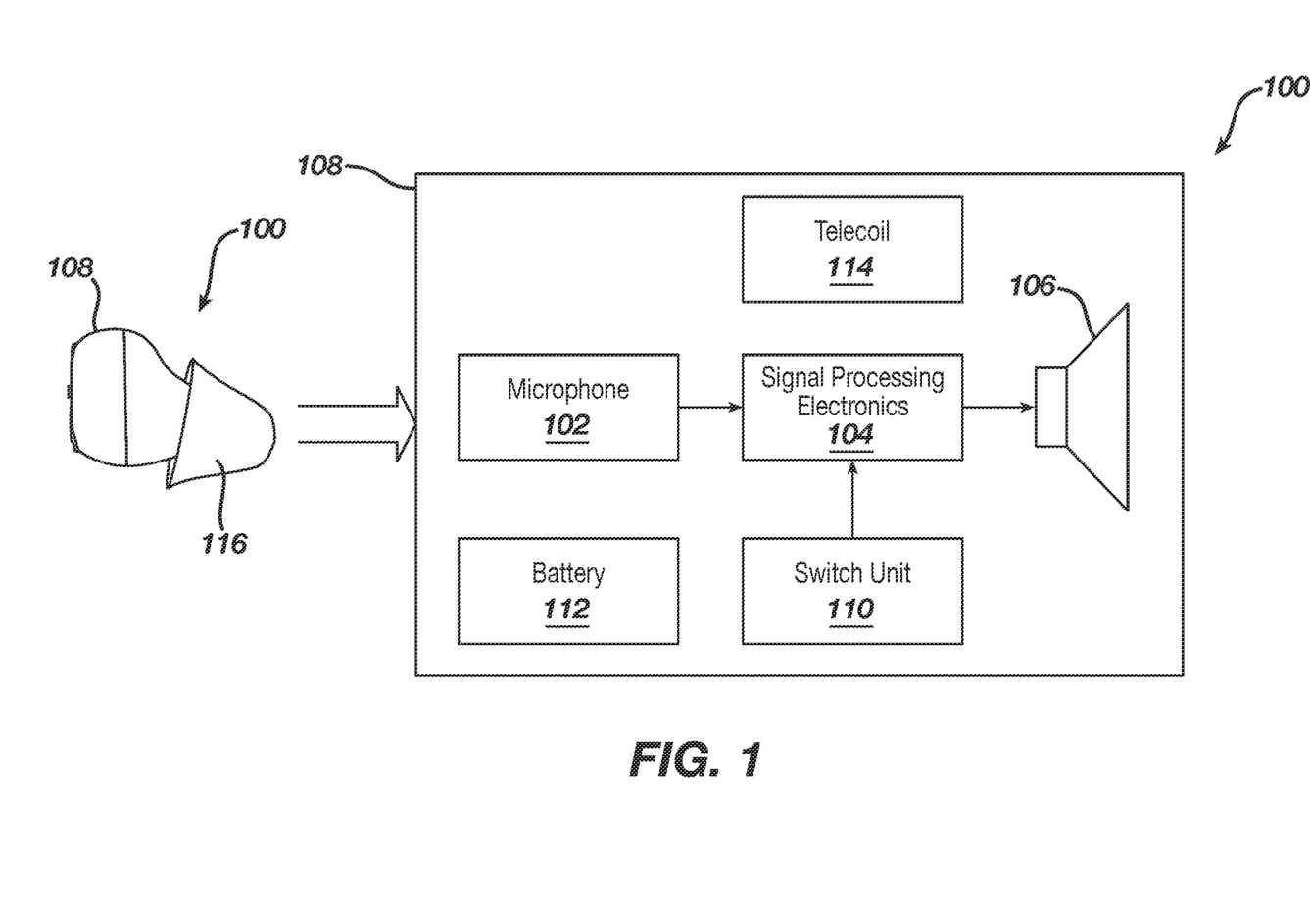
FIG. 1 illustrates a conventional in-the-ear style hearing aid.

Referring to FIG. 1, a conventional hearing aid 100 includes: a microphone 102 that converts acoustic energy into an electrical signal and outputs the electrical signal; signal processing electronics 104 (e.g., a digital signal processor, an analog-to-digital converter (ADC), and a digital-to-analog converter (DAC)) that process the electrical signal output from the microphone 102; a receiver 106 (a/k/a "speaker," "transducer," or "electro-acoustic transducer") that converts the processed electrical signal output from the signal processing electronics 104 into acoustic energy that is delivered to the user's ear canal. A case 108 houses the microphone 102, the receiver 104, and the signal processing electronics 104. A switch unit 110 is provided on the case 106 to allow for manual adjustment of the hearing aid 100.

Also housed within the case 108 is: a battery 112 that supplies power to internal circuitry including the signal processing electronics 104; and a telecoil 114. The telecoil 114 is a small coil inside the hearing aids 100 that works as a small receiver which picks up signals from a loop system that acts as an electromagnetic field. Hearing aids with an activated telecoil can convert this electromagnetic field into a sound signal. Only the signal from the loop system's microphone is amplified, and background noise is shut out. The switch unit 110 may include provision, a "t-switch," for activating the telecoil 114. In some cases, the hearing aid 100 may also include a compliant tip 116, which may assist in retaining the hearing aid 100 in the user's ear canal and/or may provide an acoustic seal between the hearing aid 100 and the user's ear canal.

While its small size can allow the hearing aid 100 to be discretely hidden in the user's ear canal, it also leaves little space for packaging the electronics, which limits, among other things, the size and capacity of the battery that can be used. As a result, functionality of the hearing aid may be limited to what can be supported by the battery and other electronics. For example, certain processing operations that consume a lot of power may not be supported in order to conserve energy in the battery 112. The small footprint also limits the space available for the processor and associated memory, limiting the use of larger processors with more computing power and larger programs.

This disclosure is based on the realization that the functionality of a hearing aid can be supplemented by taking advantage of near-field magnetic induction (NFMI) communication in combination with a wearable electronic device. NFMI a short range (i.e., less than 2 meters) wireless physical layer that communicates by coupling a tight, low-power, non-propagating magnetic field between devices. At least some of the processing operations for the hearing aid may be performed by the wearable electronic device to produce a processed audio signal that can then be transmitted to the hearing aid via an NFMI coupling. The wearable electronic device can provide a larger footprint for supporting a larger, more powerful processor, more memory, a larger battery. This can enable more functionality than would otherwise be supported by the hearing aid electronics alone, and, in combination with the low power required for NFMI communication, can also help to conserve battery power on the hearing aid.

Figure 2:
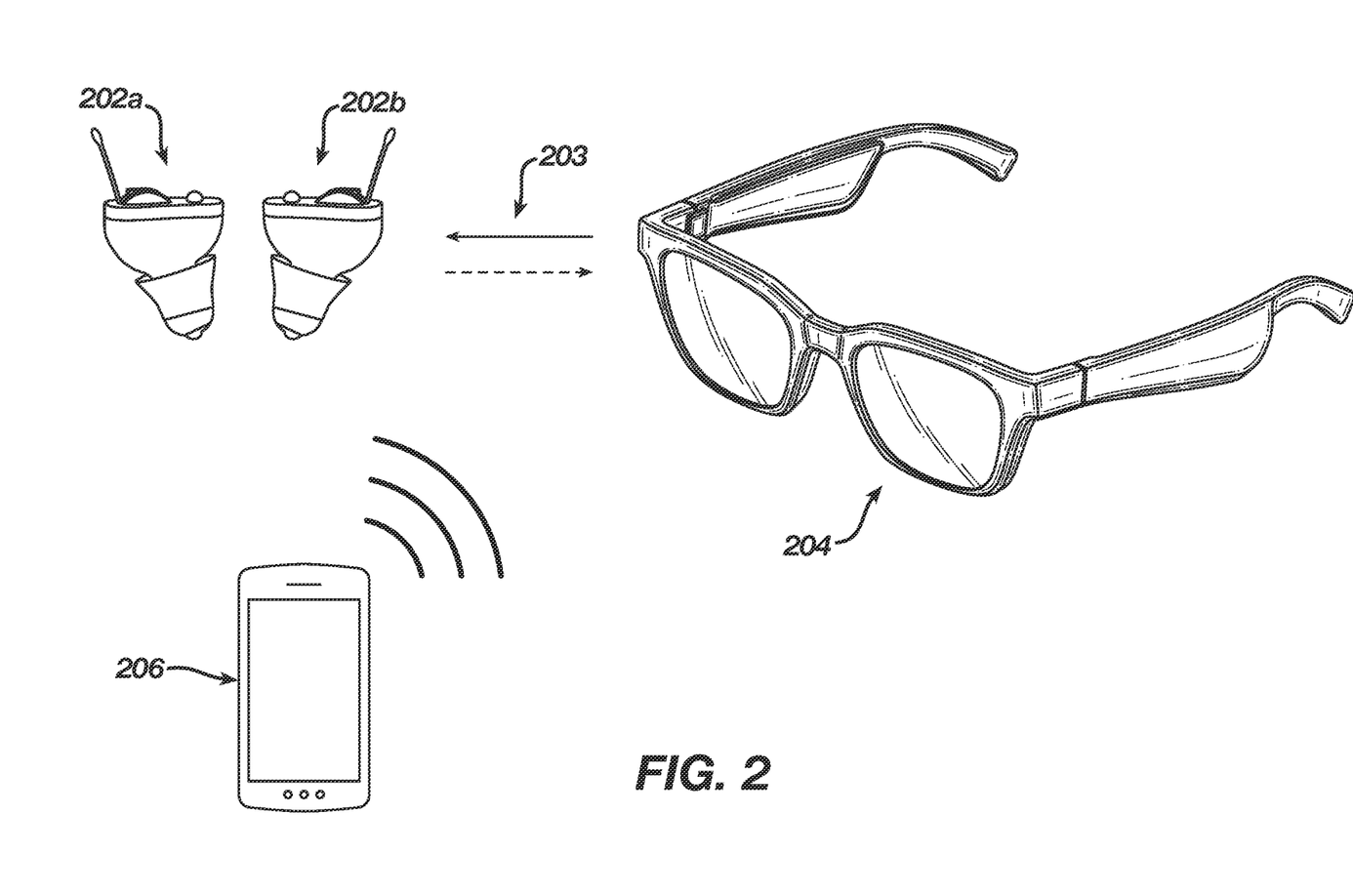
FIG. 2 is a block diagram schematically illustrating a hearing aid system according to the present disclosure.

As shown in FIG. 2, a wireless hearing aid system 200 includes: left and right hearing aids 202a and 202b (generally "202"); and a wearable electronic device 204 that transmits audio signals and various information signals with respect to the left and right hearing aids 202a and 202a via NFMI coupling 203. The wearable electronic device 204 can handle functions that require significant processing resources and/or can consume significant power resources on behalf of the hearing aids 202. Processed audio signals can then be transmitted to the hearing aids 202 for transduction to acoustic energy and delivery to the user's ear canal. This can help to preserve battery life on the hearing aids 202 and can also enable processing functions that might not otherwise be supported on the hearing aids 202. For example, the wearable electronic device 204 can provide active noise cancellation (ANC) for countering unwanted environmental noise with the generation of anti-noise signals. In some implementations, the processing is partitioned such that at least some of the processing is performed on the hearing aid 202 and at least some is performed on the wearable electronic device 204. For example, processing for active noise reduction may be performed on the wearable electronic device 204 and hearing aid processing is performed on the hearing aid 202.

Aspects and implementations disclosed herein may be applicable to a wide variety of wearable electronic devices in various form factors, such as head-worn devices (e.g., helmets, hats, visors, headsets, eyeglasses)

The system 200 may also include a computing device 206 for controlling one or more aspects of the hearing aids 202 and/or the wearable electronic device 204. The computing device 206 may communicate wirelessly with the hearing aids 202 and/or the wearable electronic device 204, e.g., via Bluetooth communication protocol. The computing device 206 may be configured to provide a user interface to allow a user to adjust signal processing parameters of the hearing aids 202, such as described in U.S. Pat. No. 9,131,321, titled "HEARING ASSISTANCE DEVICE CONTROL," which issued on Sep. 8, 2015, the complete disclosure of which is incorporate herein by reference. Alternatively, or additionally, the computing device 206 may provide a user interface for controlling one or more functions or features of the wearable electronic device 204, such as a level of active noise cancellation such as described in U.S. Pat. No. 10,074,354, titled "PROVIDING AMBIENT NATURALNESS IN ANR HEADPHONES," which issued on Sep. 11, 2018, the complete disclosure of which is incorporated by reference. In some cases, the computing device 206 may transmit hearing aid processing parameters to the wearable electronic device 204, which performs hearing aid processing, e.g., on a microphone signal, before transmitting a processed audio signal to the hearing aids 202 for transduction. In some cases, at least part of the processing, e.g., speech enhancement via deep learning, may be performed on the computing device 206.

The computing device 206 may include a personal computer (PC), a smart phone and/or a tablet computer, which is equipped with a dedicated application that individually controls functions included in the left and right hearing aids 202*a*, 202*b* and/or the wearable electronic device 204 via a control interface provided on a display of the computing device 206.

Figure 3:
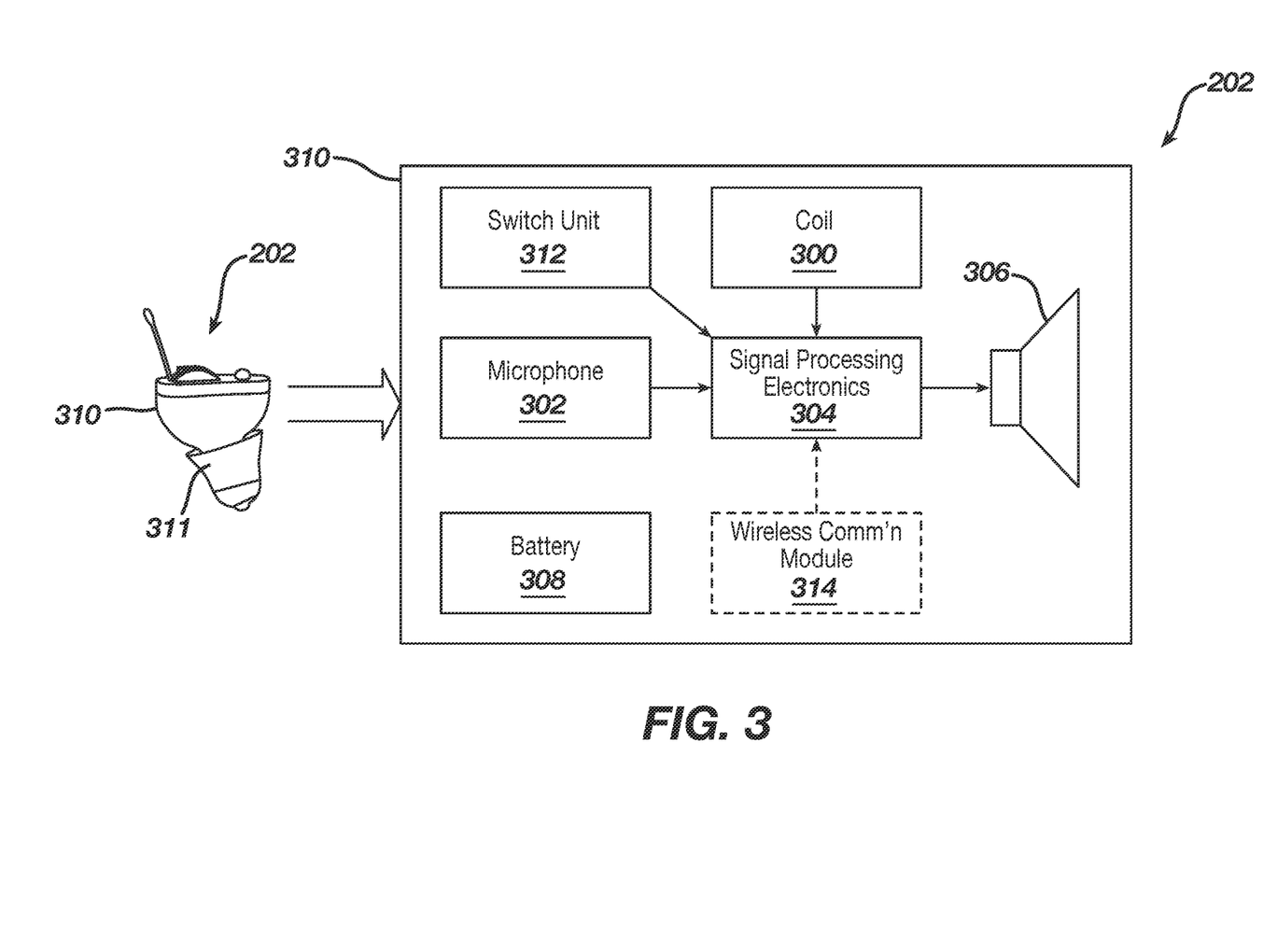
FIG. 3 is a block diagram schematically illustrating a hearing aid of the system of FIG. 2.

With reference to FIG. 3, each of the hearing aids 202 includes: a coil 300, e.g., a telecoil, for NFMI communication with the wearable electronic device 204; at least one microphone 302 for picking up ambient sounds for amplification; signal processing electronics 304 for receiving and processing signals from the microphone 302 and/or the coil 300; a receiver 306 that converts an output signal from the signal processing electronics 304 into acoustic energy that is delivered to the user's ear canal; and a battery 308 that supplies power to internal circuitry of the hearing aid 202 including the signal processing electronics 304. Each hearing aid 202 includes a case 310 that houses the coil 300; the microphone 302; the signal processing electronics 304; the receiver 306; and the battery 308. In some cases, each of the hearing aids 202 may also include a compliant tip 311, which may assist in retaining the hearing aid 202 in the user's ear canal and/or may provide an acoustic seal between the hearing aid 202 and the user's ear canal. The hearing aid 202 may also include a switch unit 312 provided on the case 310 to allow for manual adjustment of the hearing aid 202 and/or activation of the coil 300, such as described above with respect to FIG. 1.

The signal processing electronics 304 may digitize and amplify signals received from the microphone and convert the amplified signal to an analog signal for driving the receiver 306. For example, in the absence of the wearable electronic device 204, the hearing aids 202 may operate independently, albeit with limited functionality and/or reduced battery life as compared to when used in combination with the wearable electronic device 204. Alternatively, or additionally, the signal processing electronics 304 may receive a processed audio signal in digital form from the wearable electronic device 204 (FIG. 2) via the coil 300 and covert it to an analog signal for driving the receiver 306. In some cases, the microphones 302 and/or one or functions on the hearing aids 202 may be disabled when the wearable electronic device 204 is present to conserve battery power on the hearing aids 202. In certain examples, NFMI may also be used for proximity detection to detect the presence of the wearable electronic device 204 relative to the hearing aids 202.

The receiver 306 may be a moving coil transducer. The receiver 306 may be a full range micro-driver, e.g., having a diaphragm less than 6 mm in diameter, e.g., between 3 mm and 5.5 mm in diameter, e.g., 4.3 mm to 5.4 mm in diameter, such as those described in U.S. Pat. No. 9,942,662, titled "ELECTRO-ACOUSTIC DRIVER HAVING COMPLIANT DIAPHRAGM WITH STIFFENING ELEMENT," and issued on Apr. 10, 2018, and/or U.S. Pat. No. 10,609,489, titled "FABRICATING AN INTEGRATED LOUSPEAKER PISTON AND SUSPENSION," issued on Mar. 31, 2020, the complete disclosures of which are incorporated herein by reference. As used herein "full range" is intended to mean capable of producing frequencies from about 20 Hz to about 20 kHz.

In some cases, the hearing aids 202 may each include a wireless communication module 314 for communicating with each other and/or with the computing device 206 (FIG. 1) via a wireless communication protocol, such as Bluetooth, WiFi, or Zigbee. The wireless communication module 314 can allow for communication over a longer range than the coil 300. For example, one of the hearing aids 202 may receive a processed audio signal from the wearable electronic device 304 via its coil 300 and may transmit at least a portion of that processed signal to the other hearing aid 202 via the wireless communication module 314.

Figure 4:
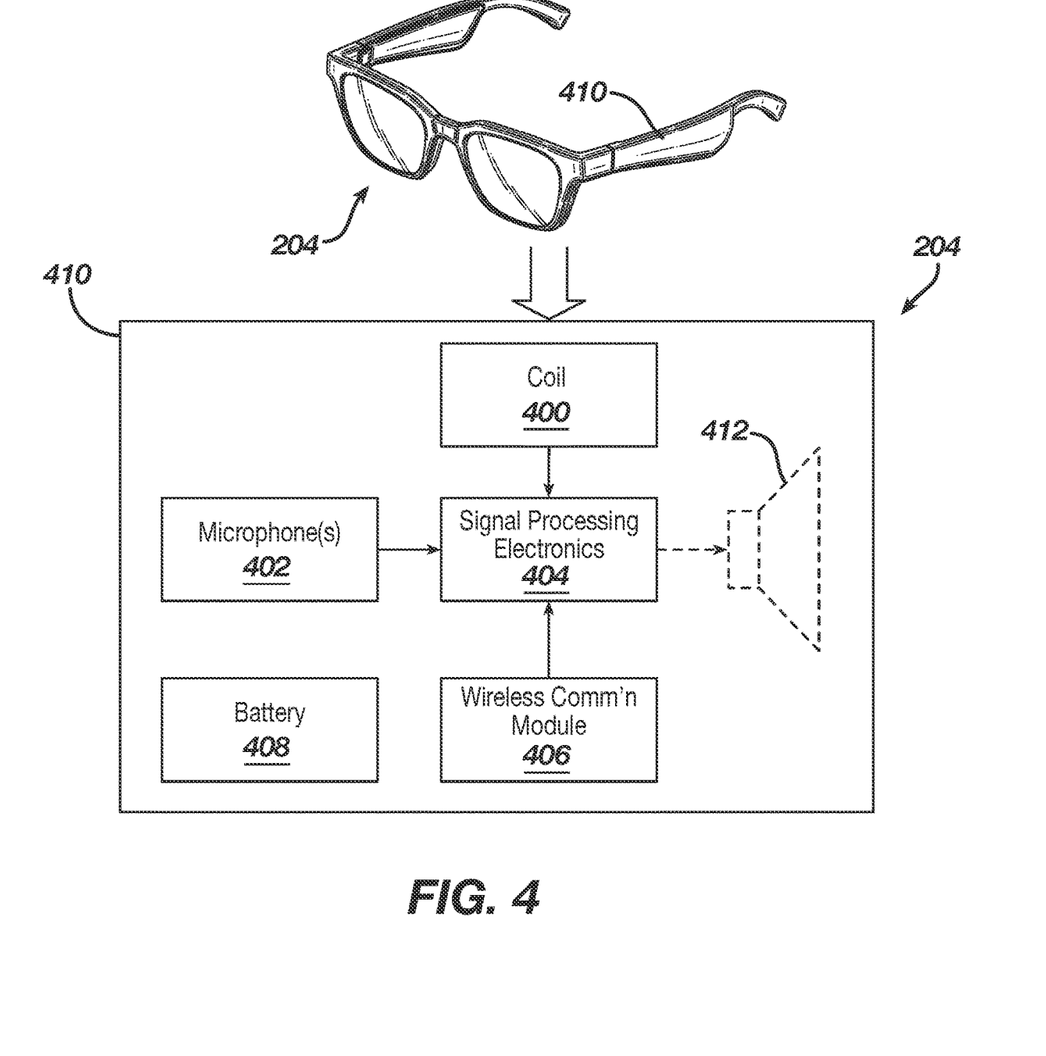
FIG. 4 is a block diagram schematically illustrating a wearable electronic device of the system of FIG. 2.

Referring to FIG. 4, the wearable electronic device 204 includes: at least one coil 400 for communicating with at least one of the hearing aids 202 via NFMI; one or more microphones 402; signal processing electronics 404 for receiving and processing signals from the microphone 402; a wireless communication module 406, e.g., for communication with the computing device 206; and a battery 408 that supplies power to internal circuitry of the wearable electronic device including the signal processing electronics 406. The wearable electronic device 204 includes a housing 410 that houses the coil 400; the microphone 402; the signal processing electronics 404; the wireless communication module 406; and the battery 408.

Since the wearable electronic device 204 is not confined to a size and shape that fits inside a user's ear canal, it can accommodate larger or additional electronics including a larger more powerful signal processing electronics and/or a larger (supplemental) battery. As a result, the wearable electronic device 204 may be able to support functionality that is not achievable on the hearing aids 202 and/or may simply help to offload some of the processing to extend the battery life of the hearing aid battery 308.

The wearable electronic device 204 support functions with high computational burden such as speech enhancement via deep learning, such as described in U.S. application Ser. No. 16/818,074, titled "AUDIO PROCESSING USING DISTRIBUTED MACHINE LEARNING MODEL," filed on Mar. 13, 2020, and active noise cancellation. The wearable electronic device 204 may include a plurality of microphones 402 the output of which can be processed by the signal processing electronics 406 to provide beamforming and/or null steering, such as described in U.S. Pat. No. 10,748,549, titled "AUDIO SIGNAL PROCESSING FOR NOISE REDUCTION," which issued on Aug. 18, 2020.

Audio signals, e.g., picked up by microphones 402 and processed by the signal processing electronics 404 can then be communicated to the hearing aids 202 via NFMI coupling between the coils 300 and 400.

Alternatively, or additionally, the wearable electronic device 204 can relay information between the computing device 206 and the hearing aids 202. For example, the wearable electronic device 204 may receive instructions to adjust signal processing parameters of the hearing aids 202 over a first "long range" wireless connection which it may then relay to the hearing aids 202 via the short range NFMI. This may be beneficial, for example, where the hearing aids 202 are not enabled with a wireless communication module capable of long-range communication. As used herein, "long range" is intended to cover conventional wireless RF systems use an antenna to generate, transmit, and propagate an electromagnetic wave including communications using traditional WiFi and Bluetooth protocols. Alternatively, the wearable electronic device 204 may be used to relay information between the computing device 206 and the hearing aids 202 simply to conserve the battery on the hearing aids 202 as the NFMI communication consumes less power than conventional RF communications.

In some cases, the respective coils 300 and 400 can be used to transmit signals from the hearing aid microphones 302 to the wearable electronic device 204 for processing. For example, the microphone signals from the hearing aids 202 may be used as input to a deep learning speech enhancement algorithm that is executed on the wearable electronic device 204, the output of which can be transmitted back to the hearing aids 202 via the NFMI coupling and transduced to acoustic energy via the receivers 306. Alternatively, or additionally, the wearable electronic device 204 may process the microphone signals from the hearing aids 202, e.g., together with the signals from the on-board microphone(s) 402, to provide beamforming.

In some implementations, the wearable electronic device 204 may include one or more electro-acoustic transducers 412 such that, in the absence of the hearing aids 202, the wearable electronics device 204 is operable as a standalone audio device and/or hearing enhancement device. The electro-acoustic transducer(s) 412 may be disable when the hearing aids 202 are detected.

Figure 5:
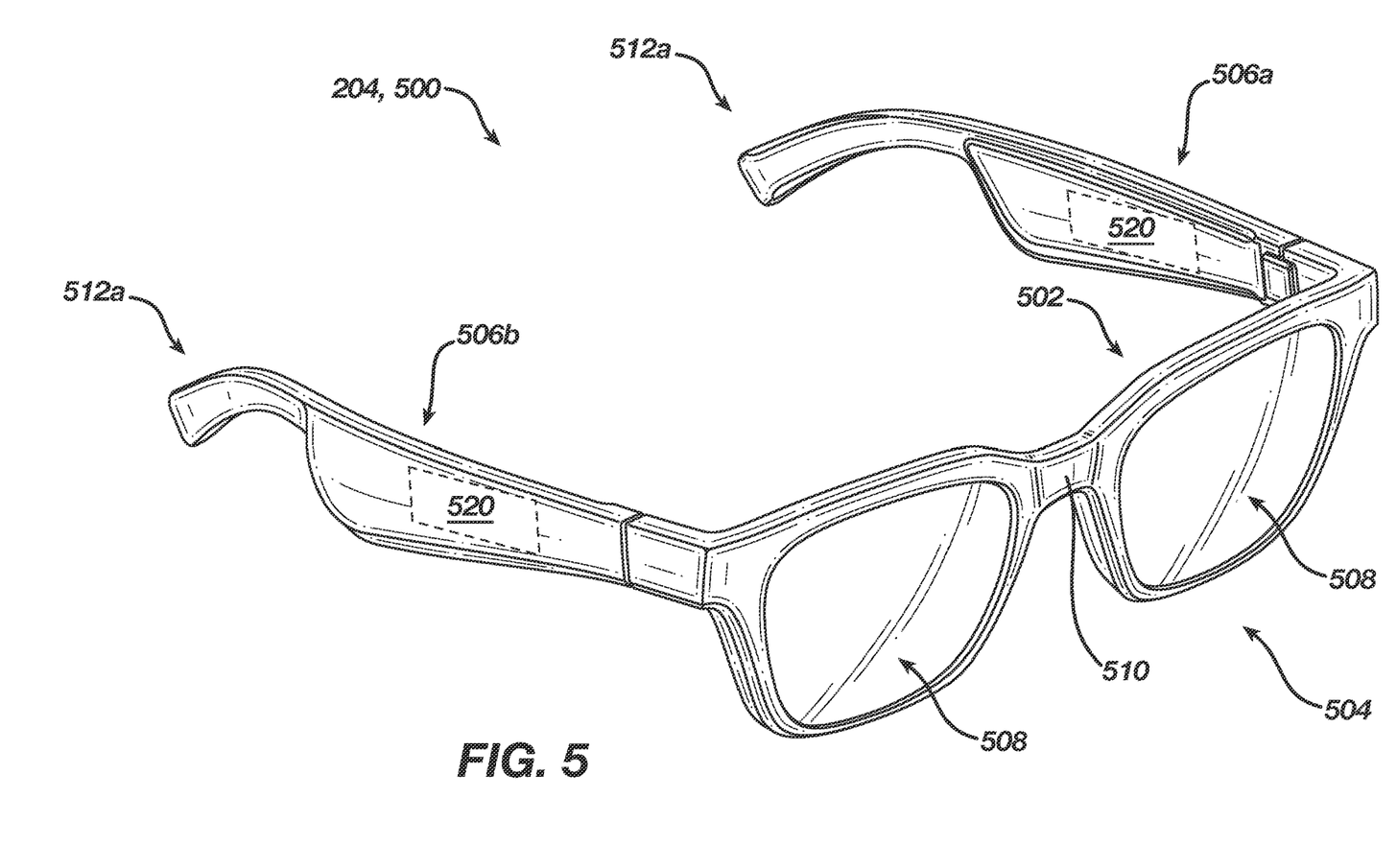
FIG. 5 is a perspective view of a set of eyeglasses that may serve as the wearable electronic device of FIG. 2.

With reference to FIG. 5, the wearable electronic device 204 may take the form of a pair of eyeglasses 500. The eyeglasses 500 include a frame 502 having a frontal region 504 and a pair of temple pieces (also referred to as arms) 506a and 506b (506, in general) extending from the frontal region 504. As with conventional eyeglasses, the frontal region 504 and temple pieces 506 are designed for resting on the head of a user. The frontal region 504 can include a set of lenses 508 fitted to corresponding lens receptacles. The frame 502 includes a bridge 510 that is configured to sit on the nose.

The temple pieces 506 are configured to sit on or near the left and right ears, typically with distal ends 512a, 512b (512, in general) against the head behind the user's ear. One or both temple portions 506 may carry electronics 520 including the coil 400; the microphone(s) 402; the signal processing electronics 404; the wireless communication module 406; and the battery 408 illustrated in FIG. 4. In some examples, each of the temple pieces 506 includes its own corresponding set of the electronics illustrated in FIG. 4.

Alternatively, the eyeglasses 500 may include one set of the electronics illustrated in FIG. 4 with the addition of one extra coil 400 so that each temple piece 506 may be provided with a corresponding coil 400 for NFMI communication with a corresponding one of the hearing aids 202. The remainder of the electronics may be housed in one of the temple pieces 506 or distributed among the temple pieces 506. Electronics in the respective temple pieces 506 may be electrically connected to each other via wiring that extends through the frontal region 504. In some implementations, the electronics include the microphones 402, which can be supported asymmetrically on the temple pieces 506 as described in U.S. Pat. Appn. No. 62/982,794, titled "ASYMMETRIC MICROPHONE POSITION FOR BEAMFORMING ON WEARABLES FORM FACTOR," filed on Feb. 28, 2020, the complete disclosure of which is incorporated herein by reference. The signal processing electronics 404 can be configured to process the signal from the plurality of microphones 402 as described in U.S. Pat. Appn. No. 62/982,794.

In yet another alternative configuration, the eyeglasses 500 may include a single set of the electronics illustrated in FIG. 4 including only a single coil 400 for communicating with one of the hearing aids 202 via NFMI. The NFMI coupled hearing aid 202 can then relay data, e.g., an audio signal, to the other hearing aid 202 via respective wireless communication modules 314 (FIG. 3) in the hearing aids 202.

Figure 6:
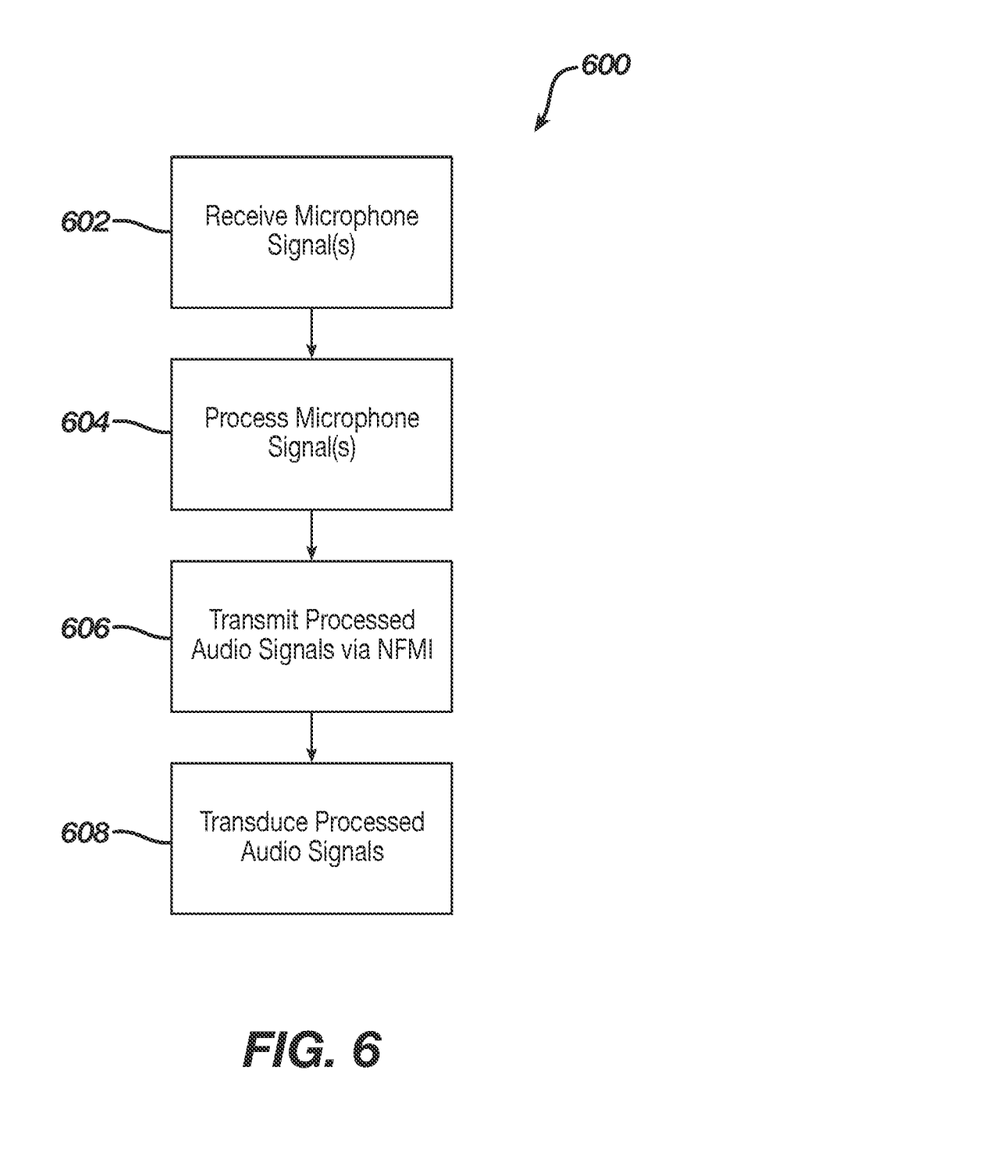
FIG. 6 a method according to the present disclosure.

With reference to FIG. 6, a method 600 according to the present disclosure includes: a first step 602 in which one or more microphone signals are received from one or more microphones of a hearing aid or a wearable electronic device. In a second step 604, the microphone signals are processed using signal processing electronics of the wearable electronics device to produce processed audio signals. The processing may include speech enhancement via a deep learning algorithm executed via signal processing electronics; active noise cancellation; and/or beamforming operations.

A third step 606 includes transmitting the processed audio signals from the wearable electronic device to the hearing aid via NFMI communication. And, the processed audio signals are transduced 608 to acoustic energy at the hearing aid in step 4.

Notably, the hearing aids 202 may remain operable to provide basic/reduced functionality in the absence of the wearable electronic device. For example, in the absence of the wearable electronic device 204, the hearing aids 202 may provide basic amplification of audio signals received from the microphones 206, without active noise cancellation or speech enhance via a deep learning algorithm.

Other Implementations

Figure 7:
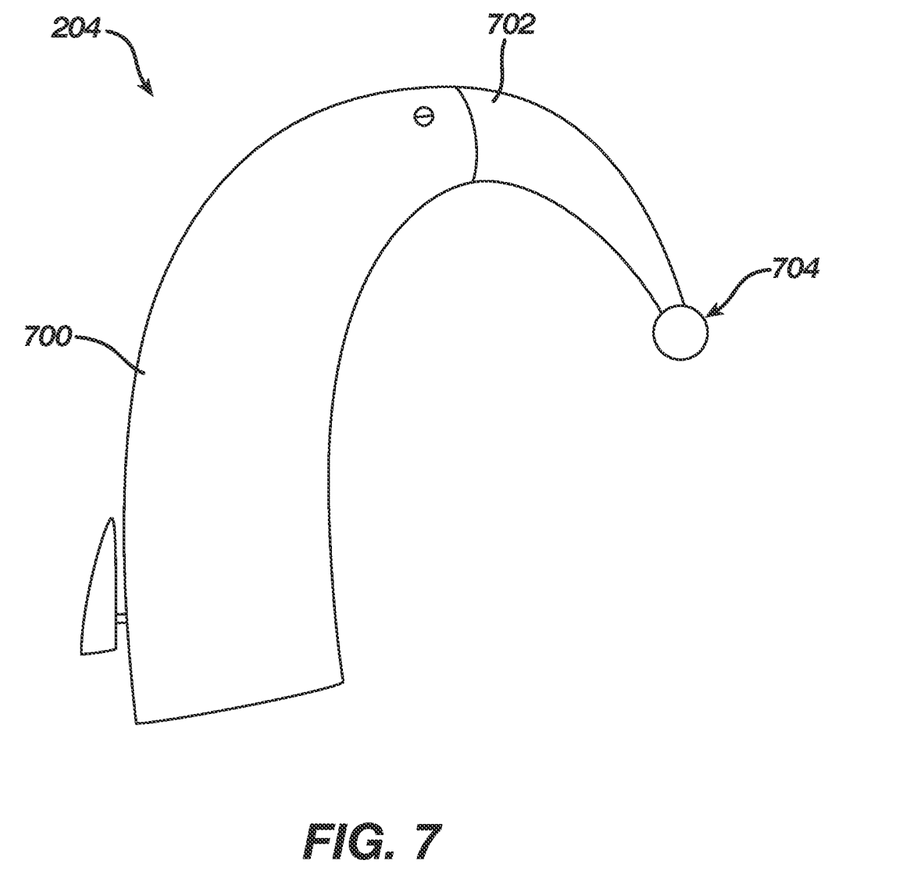
FIG. 7 is a side view of a wearable electronic device in form of a behind-the-ear electronics module.

With reference to FIG. 7, in some implementations, the wearable electronics device 204 may take the form of a behind-the-ear electronics module 700 that is held in place on the user's ear by way of an ear-hook 702 that rests in the crease between the user's pinna and head and terminates at a distal end 704 (opposite the behind-the-ear module) in a region above or adjacent to the opening of the user's ear canal. The coil can be located at or near the distal end of the ear-hook and the remaining electronics can be housed in the behind the ear module and can be connected to the coil via wiring.

While implementations have been described which may use of two hearing aids, systems with a single hearing aid are contemplated. Furthermore, the systems and methods disclosed herein are not limited to hearing aid applications and may alternatively use one or more in-ear personal amplification devices or one or more in-ear headphones for delivering processed audio received from a wearable electronic device over an NFMI connection to a user's ear canal. The term "hearing assistance device" in intended to cover hearing aids as well as personal amplification devices.

All definitions, as defined and used herein, should be understood to control over dictionary definitions, definitions in documents incorporated by reference, and/or ordinary meanings of the defined terms.

The indefinite articles "a" and "an," as used herein in the specification and in the claims, unless clearly indicated to the contrary, should be understood to mean "at least one."

The phrase "and/or," as used herein in the specification and in the claims, should be understood to mean "either or both" of the elements so conjoined, i.e., elements that are conjunctively present in some cases and disjunctively present in other cases. Multiple elements listed with "and/or" should be construed in the same fashion, i.e., "one or more" of the elements so conjoined. Other elements may optionally be present other than the elements specifically identified by the "and/or" clause, whether related or unrelated to those elements specifically identified.

As used herein in the specification and in the claims, "or" should be understood to have the same meaning as "and/or" as defined above. For example, when separating items in a list, "or" or "and/or" shall be interpreted as being inclusive, i.e., the inclusion of at least one, but also including more than one, of a number or list of elements, and, optionally, additional unlisted items. Only terms clearly indicated to the contrary, such as "only one of" or "exactly one of," or, when used in the claims, "consisting of," will refer to the inclusion of exactly one element of a number or list of elements. In general, the term "or" as used herein shall only be interpreted as indicating exclusive alternatives (i.e. "one or the other but not both") when preceded by terms of exclusivity, such as "either," "one of," "only one of," or "exactly one of."

As used herein in the specification and in the claims, the phrase "at least one," in reference to a list of one or more elements, should be understood to mean at least one element selected from any one or more of the elements in the list of elements, but not necessarily including at least one of each and every element specifically listed within the list of elements and not excluding any combinations of elements in the list of elements. This definition also allows that elements may optionally be present other than the elements specifically identified within the list of elements to which the phrase "at least one" refers, whether related or unrelated to those elements specifically identified.

It should also be understood that, unless clearly indicated to the contrary, in any methods claimed herein that include more than one step or act, the order of the steps or acts of the method is not necessarily limited to the order in which the steps or acts of the method are recited.

In the claims, as well as in the specification above, all transitional phrases such as "comprising," "including," "carrying," "having," "containing," "involving," "holding," "composed of," and the like are to be understood to be open-ended, i.e., to mean including but not limited to. Only the transitional phrases "consisting of" and "consisting essentially of" shall be closed or semi-closed transitional phrases, respectively.

The above-described examples of the described subject matter can be implemented in any of numerous ways. For example, some aspects may be implemented using hardware, software or a combination thereof. When any aspect is implemented at least in part in software, the software code can be executed on any suitable processor or collection of processors, whether provided in a single device or computer or distributed among multiple devices/computers.

The present disclosure may be implemented as a system, a method, and/or a computer program product at any possible technical detail level of integration. The computer program product may include a computer readable storage medium (or media) having computer readable program instructions thereon for causing a processor to carry out aspects of the present disclosure.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present disclosure may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some examples, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present disclosure.

Aspects of the present disclosure are described herein with reference to flowchart illustrations and/or block diagrams of methods, apparatus (systems), and computer program products according to examples of the disclosure. It will be understood that each block of the flowchart illustrations and/or block diagrams, and combinations of blocks in the flowchart illustrations and/or block diagrams, can be implemented by computer readable program instructions.

The computer readable program instructions may be provided to a processor of a, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various examples of the present disclosure. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

Other implementations are within the scope of the following claims and other claims to which the applicant may be entitled.

While various examples have been described and illustrated herein, those of ordinary skill in the art will readily envision a variety of other means and/or structures for performing the function and/or obtaining the results and/or one or more of the advantages described herein, and each of such variations and/or modifications is deemed to be within the scope of the examples described herein. More generally, those skilled in the art will readily appreciate that all parameters, dimensions, materials, and configurations described herein are meant to be exemplary and that the actual parameters, dimensions, materials, and/or configurations will depend upon the specific application or applications for which the teachings is/are used. Those skilled in the art will recognize or be able to ascertain using no more than routine experimentation, many equivalents to the specific examples described herein. It is, therefore, to be understood that the foregoing examples are presented by way of example only and that, within the scope of the appended claims and equivalents thereto, examples may be practiced otherwise than as specifically described and claimed. Examples of the present disclosure are directed to each individual feature, system, article, material, kit, and/or method described herein. In addition, any combination of two or more such features, systems, articles, materials, kits, and/or methods, if such features, systems, articles, materials, kits, and/or methods are not mutually inconsistent, is included within the scope of the present disclosure.

What is claimed is:

1. A system comprising:
   A.) an in-ear acoustic device configured to sit at least partially within a user's ear canal, the in-ear acoustic device comprising:
      i.) a first receiver;
      ii.) a first coil; and
   B.) a head-worn electronic device supported on a user's body outside of the user's ear canal comprising:
      i.) a second coil configured to communicate with the first coil via near-field magnetic inductance (NFMI) communication,
   wherein the head-worn electronic device is configured to transmit a first processed audio signal to the in-ear acoustic device via NFMI communication, and
   wherein the first processed audio signal is used to drive the first receiver,
   wherein the in-ear acoustic device further comprises:
   a first microphone; and
   first signal processing circuitry electrically connected to the first microphone, the first receiver, and the first coil; and
   the head-worn electronic device further comprises:
   a second microphone; and
   second signal processing circuitry electrically connected to the second microphone and the second coil,
   wherein the head-worn electronic device is configured to:
   receive one or more first microphone signals from the first microphone and/or the second microphone;
   process the one or more first microphone signals via the second signal processing circuitry to produce the first processed audio signal; and
   transmit the first processed audio signal to the hearing assistance device via the second coil,
   wherein the system further comprises a computing device,
   wherein the head-worn electronic device includes a wireless communication module for communicating with the computing device,
   wherein the head-worn electronic device is configured to receive one or more settings from the computing device and processes the one or more first microphone signals according to the settings, wherein the settings comprise: an active noise cancellation (ANC) level; beamforming parameters; null steering parameters; and/or signal processing parameters for hearing aid processing.

2. The system of claims 1, wherein at least one of: (i) the in-ear acoustic device; and (ii) the head-worn electronic device includes a microphone, and the head-worn electronic device includes signal processing circuitry for processing a microphone signal from the microphone to produce the first processed audio signal.

3. The system of claim 2, wherein the processing includes: active noise cancellation; microphone beamforming; and/or speech enhancement via a deep learning algorithm.

4. The system of claim 1, wherein in the absence of the head-worn electronics device, the first signal processing electronics are configured to receive and process a second microphone signal from the first microphone and produce a second processed audio signal that is used to drive the receiver.

5. The system of claim 4, wherein the in-ear acoustic device is configured to detect the presence of the head-worn electronic device via NFMI.

6. A system comprising:
A.) an in-ear acoustic device configured to sit at least partially within a user's ear canal, the in-ear acoustic device comprising:
  i.) a first receiver;
  ii.) a first coil; and
B.) a head-worn electronic device supported on a user's body outside of the user's ear canal comprising:
  i.) a second coil configured to communicate with the first coil via near-field magnetic inductance (NFMI) communication,
wherein the head-worn electronic device is configured to transmit a first processed audio signal to the in-ear acoustic device via NFMI communication, and
wherein the first processed audio signal is used to drive the first receiver, and
wherein the head-worn electronic device is in a form selected from the group consisting of: a helmet, a hat, a visor, a headset, and eyeglasses.

7. The system of claim 6, wherein the head-worn electronic device is in the form of eyeglasses, the eyeglasses comprising:
a frame having a frontal region; and
a pair of temple pieces extending from the frontal region, wherein the second coil is supported in one of the temple pieces.

8. The system of claim 7, wherein the eyeglasses further comprise:
a plurality of microphones and signal processing electronics supported on one or both of the temple pieces,
wherein the signal processing electronics are configured to process microphone signals from the microphones to produce the processed audio signal.

9. A method comprising:
transmitting a first processed audio signal from a head-worn electronic device to an in-ear acoustic device via NFMI communication; and
converting the first processed audio signal to acoustic energy at the in-ear acoustic device,
wherein converting the first processed audio signal to acoustic energy at the in-ear acoustic device comprises converting the first processed audio signal from a digital form to an analog form to produce an analog processed audio signal for driving a receiver of the in-ear audio device, and
wherein the head-worn electronic device is in a form selected from the group consisting of: a helmet, a hat, a visor, a headset, and eyeglasses.

10. The method of claim 9, further comprising:
receiving one or more microphone signals from one or more microphones of the in-ear acoustic device and/or the head-worn electronic device; and
processing the one or more microphone signals using signal processing electronics of the head-worn electronics device to produce the first processed audio signal.

11. The method claim 10, wherein the step of processing the one or more microphone signals comprises performing one or more processing operations selected from the group consisting of: speech enhancement via a deep learning algorithm; active noise cancellation; and beamforming operations.

12. The method of claim 9, further comprising receiving signal processing parameters transmitted from a computing device at the head-worn electronic device; and
producing the first processed audio signal using the signal processing parameters.

13. The method of claim 9, further comprising:
detecting an absence of the head-worn electronic device at the in-ear acoustic device;
and, in response, receiving one or more microphone signals from one or more microphones of the in-ear acoustic device; and
processing the one or more microphone signals using signal processing electronics of the in-ear acoustic device to produce second processed audio signals.

14. The method of claim 9, wherein the in-ear acoustic device is a hearing aid.

15. The method of claim 6, wherein the head-worn electronic device is in the form of eyeglasses, the eyeglasses comprising:
a frame having a frontal region; and
a pair of temple pieces extending from the frontal region, wherein the second coil is supported in one of the temple pieces.

* * * * *